United States Patent [19]

Engels et al.

[11] 4,371,065
[45] Feb. 1, 1983

[54] BRAKE-TYPE SPRING COUPLING FOR ADJUSTMENT GEARS, PARTICULARLY IN SEAT ADJUSTERS

[75] Inventors: Bernd Engels; Friedrich Heise; Heinz P. Cremer, all of Remscheid, Fed. Rep. of Germany

[73] Assignee: Keiper Automobiltechnik GmbH & Co. KG, Remscheid, Fed. Rep. of Germany

[21] Appl. No.: 229,008

[22] Filed: Jan. 27, 1981

[30] Foreign Application Priority Data

Jan. 30, 1980 [DE] Fed. Rep. of Germany ....... 3003204

[51] Int. Cl.³ .............................................. F16D 67/02
[52] U.S. Cl. .................. 192/8 C; 192/12 BA
[58] Field of Search ............. 192/8 C, 8 R, 7, 12 BA, 192/17 D

[56] References Cited

U.S. PATENT DOCUMENTS

| | | | |
|---|---|---|---|
| 2,550,801 | 5/1951 | Geerds | 192/8 C |
| 3,002,594 | 10/1961 | Haseler et al. | 192/8 C |
| 3,110,380 | 11/1963 | Meyer et al. | 192/8 C |
| 3,307,663 | 3/1967 | Luenberger | 192/8 C |
| 4,191,060 | 3/1980 | Sessa | 192/8 C |

*Primary Examiner*—George H. Krizmanich
*Attorney, Agent, or Firm*—Michael J. Striker

[57] ABSTRACT

A brake-type spring coupling for transmission gears for an adjuster comprises a shaft, a transfer cam rigidly secured to the shaft, a pair of follower segments freely rotatable about the shaft on each side of the transfer cam, a coupling cylindrical segment rotatable about the shaft to impinge against one of the follower segments, a brake drum surrounding the shaft and the supported cam, followers and coupling segments, a helical spring having its windings in frictional contact with the inner wall of the brake drum and having its end portions anchored in respective follower segments, an abutment surface formed in a lateral wall of the transfer cam to stop one of the follower segments and an adjustable ring segment secured to the other side of the transfer cam to stop the other follower segment.

9 Claims, 5 Drawing Figures

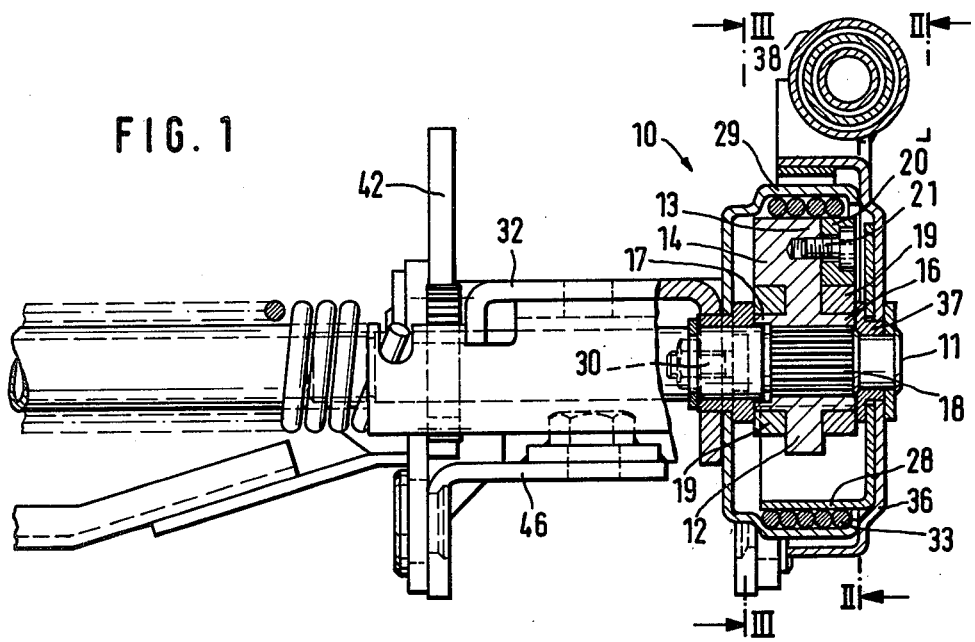
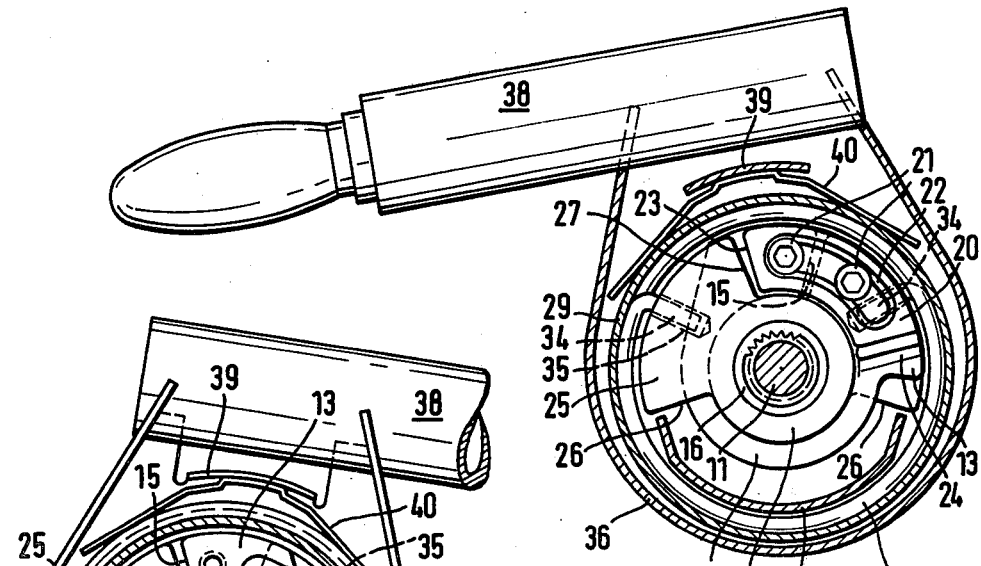

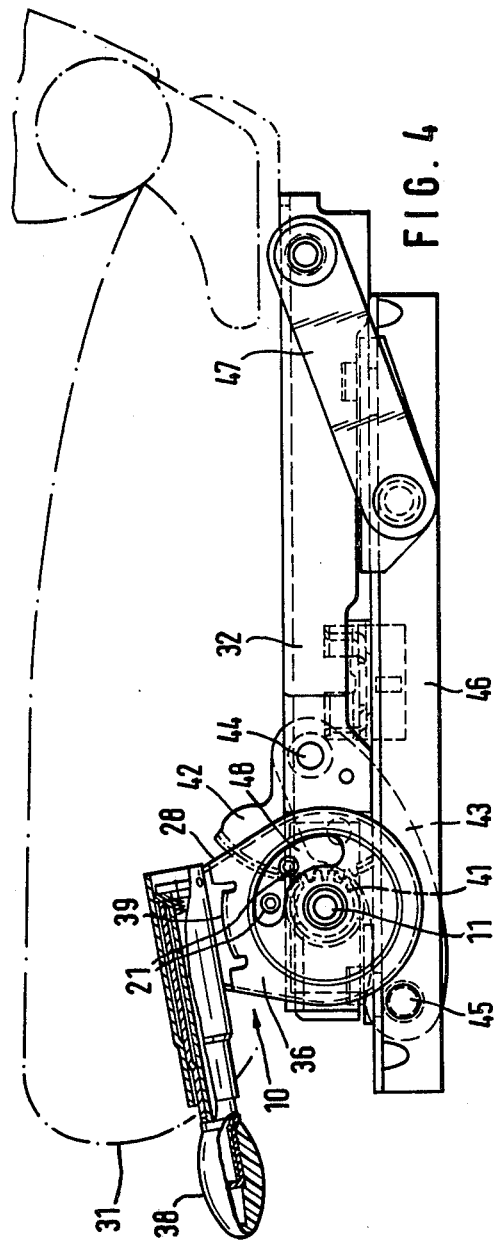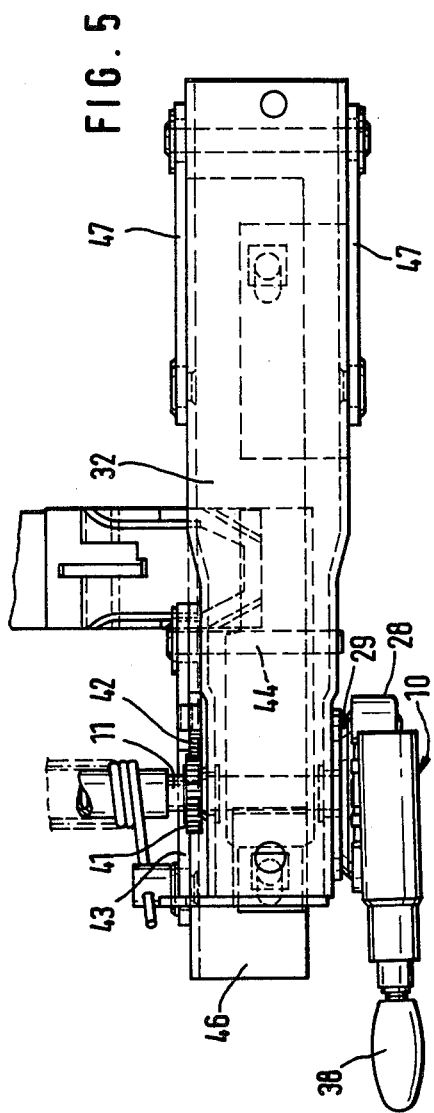

4,371,065

BRAKE-TYPE SPRING COUPLING FOR ADJUSTMENT GEARS, PARTICULARLY IN SEAT ADJUSTERS

BACKGROUND OF THE INVENTION

The present invention relates in general to spring couplings, and in particular to a brake-type spring coupling for adjustment gears in motor vehicle seat adjusters, the coupling including a bearing body for a rotary shaft, a brake drum secured to the bearing body around the shaft and defining a cylindrical inner jacket, a helical torsion spring normally frictionally engaging the inner jacket, the spring having inwardly bent hook-shaped portions, a coupling segment supported for rotation around the shaft in the brake drum, a cam element rigidly secured to the shaft and defining at each lateral side thereof abutment surfaces, and a supporting peripheral surface, a pair of follower segments supported for rotation about the shaft for movement between the abutment surfaces and the coupling segment, whereby the hook-shaped end portions of the spring are anchored in the follower segments so as to tension or release the spring in response to the sense of rotation of the coupling segment.

In a known adjustable motor-vehicle seat, the seat frame is mounted on a base frame by means of swingable supports and is vertically adjustable by adjustment gears acting on the swingable supports. A drive gear is arranged at each lateral side of the seat and is rigidly connected to an adjuster shaft supported for rotation on the lower frame. The adjuster shaft projects unilaterally from the base frame and supports both the adjustment gears and the brake spring coupling of the aforedescribed type for actuating the adjustment gears.

A balancing spring for compensating at least a part of the weight of the seat and of the seat user acts on the swingable supports of the seat. If the seat is unoccupied, the force of this balancing spring acts via the cam member which is rigidly secured to the adjuster shaft, against the transfer member connected to the end of the brake spring of the coupling and causes the spring to frictionally engage the inner wall of the brake drum. On the other hand, when the seat is loaded the transfer member swings in opposite direction due to the fact that the force of the balancing spring is overcome and the other transfer segments comes into abutment with the cam rigidly connected to the adjustment shaft. Play required for releasing the helical spring of the brake-type spring coupling is the more increased, the more the individual component parts of the coupling approach the limit of manufacturing tolerances. The excessive play of the braking spring in the coupling is not eliminated even if in the conventional brake-type spring couplings, an intermediate resilient or elastic member is employed.

SUMMARY OF THE INVENTION

It is therefore a general object of the present invention to overcome the aforementioned disadvantages.

More particularly, it is an object of the invention to provide an improved coupling of the aforedescribed type in which the combined play of individual component parts of the coupling resulting from manufacturing tolerances is rendered ineffective with respect to the desired functional play in the coupling.

Another object of this invention is to reduce the total play resulting from the combined functional and manufacturing tolerances about the total play of the manufacturing tolerances.

In keeping with these objects, and others which will become apparent hereafter, on feature of the invention resides, in the coupling of the aforedescribed type, in the provision of means for adjusting the angular position between the abutment surface of the cam member on the adjustment shaft and the opposite abutment surfaces on the rotary follower member. By virtue of the adjustability of the angular position of the facing abutment surfaces, it is possible that play between the transfer elements connected to respective hook-shaped end portions of the braking torsional spring and the corresponding abutment surfaces on the cam member, can be accurately limited to a value which is necessary for disengagement of the braking torsional spring from the inner wall of the brake drum of the coupling.

For this purpose, the transfer cam member which is rigidly connected to the adjustment shaft is preferably provided on both lateral sides thereof with hub flanges each supporting for rotation the rotary follower member connected with an assigned hook-shaped end of the brake spring. One of the follower members rests on the adjustable abutment surface of the transfer cam member when rotated in one spring-releasing direction, and the other rotary transfer follower abuts against a fixed abutment surface of the cam member when rotated in an opposite releasing direction.

In a preferred embodiment of this invention, the adjustable abutment surface is in the form of a ring segment provided with an arcuate cut-out for receiving adjustment screws which fasten the ring segment to the supporting cam member.

In order to ensure a reliable connection of the hook-shaped end portions of the brake spring to the rotary follower members and a well defined angular position with respect to the cooperating abutment surfaces on the supporting cam, according to another feature of this invention the rotary follower members are provided with attachments in the form of ring segments, one of the radial surfaces of the segments being engageable with the rotary coupling member and the opposite radial surfaces of the ring segments being engageable with corresponding abutment surfaces of the cam member. The peripheral surfaces of the follower segments being provided with radially directed blind bores located approximately midway between the radial surfaces for receiving the assigned hook-shaped end portions of the tension spring. Due to the central arrangement of the radial blind bores in the ring segment attachments of the rotary transfer members, it is possible to manufacture the latter in an identical form and size, so that any errors during the assembly of the couplings are eliminated.

To mount the adjustment ring segment piece which exhibits the largest play, on the supporting cam, the latter is provided with an abutment surface which supports the ring segment in its starting position.

In order to readjust the play both upon the installation of the seat or to determine the play in an adjusted seat position, for example by exchanging the existing adjustment ring segment for another one, in another embodiment of this invention the coupling member is connected to a cup-shaped jacket surrounding the brake drum, the jacket having a cut-out in the range of the ring segment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is an axial cross-section of a brake-type spring coupling according to this invention, in connection with a vertical-position-adjusting device connectable to a longitudinal side of a motor-vehicle seat;

FIG. 2 is a sectional view of the brake-type spring coupling of FIG. 1, taken along the line II—II;

FIG. 3 is a sectional view of the coupling according to FIG. 1, taken along the line III—III;

FIG. 4 is a front view of the brake-type spring coupling installed in connection with a vertical adjuster of a motor vehicle seat; and FIG. 5 is a plan view of a vertical-position-adjusting device for a motor-vehicle seat arranged at a longitudinal side of the seat with flanged-on coupling according to this invention.

DESCRIPTION OF THE PREFERRED EMBODIMENTS

Referring firstly to FIGS. 1-3, the illustrated brake-type spring coupling 10 includes a transfer member 12 rigidly connected to a rotary adjustment shaft 11, the transfer member being formed with a radially projecting transfer cam 13 defining at one side thereof a segment-like attachment 14 delimited unilaterally by a radially extending abutment surface 15. The transfer member 12 at both sides of its transfer cam 13 is provided with hub flanges 16 and 17 formed concentrically with the adjustment shaft 11 and being connected to the latter by splines 18. Each of the hub flanges 16 and 17 supports for free rotation a follower 19 adjoining the lateral sides of the transfer member 12. A radial surface of one of the followers 19 is arranged opposite the abutment surface 15 formed on the adjoining side of the segment-like extension 14 of the cam 13. The opposite side of the extension 14 supports an adjustable ring segment piece 20 formed with an arcuate elongated cut-out 22, the curvature of which is concentric with the axis of rotation of the shaft 11. Fastening screws 21 pass through the cut-out 22 and tighten the ring segment 20 in a desired angular position to the extension of the supporting cam 13. One of the radial end surfaces of the adjustable ring segment 20 serves as an abutment surface 23 for the other follower 19, while as mentioned before, the fixed abutment surface 15 on the extension 14 of the supporting cam serves as an abutment surface for the first-mentioned follower 19. The other radial end surface of the ring segment piece 20 rests in a starting position of the adjustable segment piece 20 on a stop surface 24 formed in the extension 14 of the cam 13.

Each follower 19 has a ring segment extension 25 defining two radial end surfaces. One radial end surface 26 of each extension 25 is acted upon by an end of the rotary coupling member 28, whereas the other radial end surface 27 of each follower extension 25 impinges against an assigned abutment surface 15 or 23 of the transfer cam 13. The aforedescribed component parts of the coupling are enclosed in a brake drum 29 which is rigidly secured for example by means of screws 30 to a mounting cross-beam 32 fixed to a lower part of the adjustable seat. The cylindrical inner wall of the brake drum 29 is spaced apart from the peripheral surfaces of the coupling member 28, of the extensions 14 of the cam 13, and from the peripheral surfaces of respective followers 19 about a distance defined within narrow tolerances. The inner cylindrical wall of the brake drum 29 is in frictional engagement with the windings of a biased helical spring 33 having inwardly bent hook-shaped end portions 34 which are anchored in radial bores 35 formed in peripheral surfaces of respective extensions 25 of the followers 19, midway between the radial end surfaces 26 and 27.

The control member 28 is a part of an adjustment unit including a cup-shaped disk 36 formed with a central hub 37 which is supported for rotation on the adjustment shaft 11.

The control coupling element 28 is in the form of a cylindrical section rigidly connected to the side wall of the cup-shaped disk 36 and projecting into the inner space of the brake drum 29 below the spring 33. During the rotation of the coupling member 38 in either direction, one of the end surfaces 26 of the followers 19 is acted upon by the end edge of the coupling member 28 and rotated into abutment against an assigned abutment surface 23 or 15 on the cam member 13. To control the angular position of the coupling member 28, the cup-shaped disk 36 is connected to a handle 38 extending tangentiatly to the circumference of the disk 36 and, preferably, is telescopically extendable.

To arrest the coupling member 28 in its adjusted angular position, the disk 36 is formed with a holding arm 39 projecting above the outer periphery of the brake drum 29 and supporting braking elements 40. In the present embodiment, each braking element 40 consists of a leaf spring biased against the outer surface of the brake surface 29. Due to the resulting frictional forces, the coupling member 28 is arrested in its adjusted position with respect to the brake drum 29.

Upon actuation of the control handle 38 in either rotational direction of the coupling unit 28 and 36, the end edge of the cylindrical segment 28 impinges on one of the radial end surfaces 26 of the follower 19 and upon overcoming the force of a biasing spring on the shaft 11 it rotates the follower 19 together with the hook-shaped end portion 34 of the braking spring 33 either against the abutment surface 15 of the transfer cam 13 or against the abutment surface 23 at the opposite lateral side of the cam 13. As a consequence, cam 13 and thus the transfer members 12 and the shaft 11 follow the rotation of the control handle 38.

Referring now to FIGS. 4 and 5, illustrating the application of the coupling of this invention on a vertical adjuster of a motor-vehicle seat 31, it can be seen that the brake-type spring coupling 10 is mounted on an end portion of the adjuster shaft 11 which in turn is supported for rotation on a cross-beam 32 and supports a driving pinion 41 of the transmission gears for the adjuster. The driving pinion 41 meshes with a toothed segment 42 formed on a swinging support 43, the latter being pivotably mounted by means of a pivot pin 44 to the cross-beam 32 and in addition being also pivotably mounted by means of a pin 35 to the lower frame 46 of the seat 31 indicated in FIG. 4 by dashed lines.

If the shaft 11 and thus the driving pinion 41 is rotated by the aforedescribed mechanism of the brake-type spring coupling 10 clockwise, the toothed segment 42 is rotated by the driving pinion 41 counterclockwise, and consequently the swingable supports 43 which are pivotably mounted about a stationary pivot pin 45 and a coupling pin 44, are raised. To ensure a parallel lifting movement at the rear end of the cross-beam 32, there are provided additional swingable supports 47 pivotably secured to the base frame 46 and the supporting beam 32.

Upon releasing the control handle 38, the tensioned and retracted helical spring 33 returns immediately into its backing position in contact with the inner wall of the brake drum 29 to hold the supporting beam 32 in its adjusted vertical position. When the driving pinion 41 in the transmission gear of the seat adjuster is rotated by the aforementioned parts of the brake-type spring coupling 10 of this invention counterclockwise, the vertical adjustment of the seat takes place in opposite direction.

As can be seen particularly from FIG. 4, the cup-shaped coupling disk 36 in the region of the adjustable ring segment piece 20 has a cut-out 48 through which the screws 21 can be either tightened or loosened, and the form and size of the cut-out 48 is sufficient for permitting the exchange of the ring segment piece 20 if so desired. By adjusting the angular position of the impact surface 23 with respect to the striking surface 27 of the follower 19, any excessive play between the abutment surfaces 15 and 23 resulting from the manufacturing tolerances of respective component parts can be completely eliminated. By virtue of the accurately adjusted angular positions between the abutment surfaces, any misadjustment in the vertical adjuster of the seat can no longer occur, and the supporting linkage of the seat part 31 is reliably held in its adjusted vertical position.

It will be understood that each of the elements described above, or two or more together, may also find a useful application in other types of constructions differing from the types described above.

While the invention has been illustrated and described as embodied in a brake-type spring coupling in cooperation with transmission gears of a vertical adjuster for motor-vehicle seats, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A brake-type spring coupling for adjustment gears, particularly for use in motor-vehicle seat adjusters, comprising an adjustment shaft supported for rotation about an axis; a stationary brake drum coaxially surrounding a portion of said shaft; a helical torsion spring coaxially arranged around said axis and being biased into a frictional contact with the cylindrical inner wall of said brake drum, said spring having inwardly bent end portions; a control means including a coupling segment arranged between said shaft and said spring and being supported for free rotation about said shaft; a transfer cam member rigidly secured to said shaft portion and defining at one lateral side thereof a radially directed abutment surface; a pair of follower segments supported for free rotation about said shaft and each being acted upon by an end surface of said coupling segment to be angularly displaced toward said transfer cam; said inwardly bent end portions of said spring being anchored in said follower segments to disengage said spring from said brake drum when said follower segments are rotated in a spring-tensioning direction; and means adjustably secured to the other lateral side of said transfer cam for adjusting the mutual angular position between said follower segments and the abutment surface on said transfer cam.

2. A coupling as defined in claim 1, comprising a transfer member secured for joint rotation to said adjustment shaft, said transfer member defining two hub flanges and said transfer cam projecting from said transfer member between said hub flanges, said follower segments being rotatable on said hub flanges whereby in rotating said coupling member in one direction, one of said follower members is thrust against the radially directed abutment surface of said cam member and in rotating said coupling segment in opposite direction the other follower segment is thrust against said adjustable means on said transfer cam.

3. A coupling as defined in claim 1, wherein said position-adjusting means is in the form of a ring segment having an elongated cut-out, and fastening screws passing through said cut-out for adjustably tightening said ring segment piece to said transfer cam.

4. A coupling as defined in claim 3, wherein each of said follower segments defines a radially directed end face engageable with said coupling segment and another radially directed end face engageable with one of the abutment surfaces on said transfer cam, and a blind bore formed in the peripheral surface between the end faces to receive the hook-shaped end portions of said helical tension spring.

5. A coupling as defined in claim 3, wherein said transfer cam includes an additional abutment surface engageable with the other radially directed end surface of said adjustable ring segment piece when the latter is in its starting position.

6. A coupling as defined in claim 1, further including a cup-shaped coupling disk having a peripheral jacket surrounding said brake drum and being supported for rotation about said adjustment shaft.

7. A coupling as defined in claim 6, wherein said coupling segment is rigidly connected to said coupling disk and said coupling disk being provided with a cut-out in the range of said adjusting means.

8. A coupling as defined in claim 6, further including a control handle secured to said coupling disk.

9. A coupling as defined in claim 8, further including braking means arranged between said handle and the outer periphery of said brake drum to hold the adjusting position of said coupling segment.

* * * * *